(12) United States Patent
Sato et al.

(10) Patent No.: US 6,441,079 B2
(45) Date of Patent: Aug. 27, 2002

(54) CURABLE FLUOROPOLYETHER BASE RUBBER COMPOSITIONS

(75) Inventors: Makoto Sato; Takashi Matsuda; Shinichi Sato; Masatoshi Arai, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/754,319

(22) Filed: Jan. 5, 2001

(30) Foreign Application Priority Data

Jan. 7, 2000 (JP) ........................................ 2000-001205

(51) Int. Cl.$^7$ ................................................. C08K 3/34
(52) U.S. Cl. ........................ 524/448; 524/492; 524/493
(58) Field of Search ................................ 524/448, 492, 524/493

(56) References Cited

U.S. PATENT DOCUMENTS 5,164,517 A  * 11/1992  Marchionni et al. ........ 549/380

* cited by examiner

*Primary Examiner*—Edward J. Cain
(74) *Attorney, Agent, or Firm*—Millen, White, Zelano & Branigan, P.C.

(57) ABSTRACT

A curable fluoropolyether base rubber composition contains (A) 100 parts by weight of a linear fluoropolyether compound having at least two alkenyl groups in a molecule and a perfluoroalkyl ether structure in its backbone, (B) 10–40 parts by weight of a silica filler having a specific surface area of at least 50 $m^2/g$, (C) 5–35 parts by weight of diatomaceous earth, (D) an organosilicon compound having at least two Si—H groups, and (E) a hydrosilylation catalyst. The inclusion of diatomaceous earth is effective for preventing the composition from outgassing and from changing its curing behavior with time.

20 Claims, 1 Drawing Sheet

FIG.1

CURABLE FLUOROPOLYETHER BASE RUBBER COMPOSITIONS

This invention relates to curable fluoropolyether base rubber compositions which are improved in the stability of thermal curing ability over time and suppressed in outgassing and cure into rubbers having improved water repellency, oil repellency, solvent resistance, chemical resistance and weather resistance.

BACKGROUND OF THE INVENTION

From the past, linear fluoropolyether compounds having at least two alkenyl groups in a molecule and a perfluoroalkyl ether structure in their backbone are used in a wide variety of applications by virtue of advantageous properties of the perfluoroalkyl ether structure. It is known that by blending the curable fluoropolyether compounds with silica fillers commonly used with silicone rubber for reinforcement purposes, mechanical properties of the cured rubber can be drastically improved. Such silica fillers include dry silica also known as fumed silica and wet silica also known as precipitated silica. The blending of silica fillers yields fluoropolyether base rubber compositions having a good profile of heat resistance, chemical resistance, solvent resistance, water repellency, oil repellency, and weather resistance which are satisfactory in most applications.

However, in a particular application where molded rubber parts such as O-rings are used in semiconductor parts, hard disk drives and the like, there is a need for a molding material having minimized outgassing. For such molding material, it is also a problem that a curing behavior changes with time during shelf storage owing to impurities such as amine and sulfur. It is essential for molding material to show a stable curing behavior.

SUMMARY OF THE INVENTION

An object of the invention is to provide a curable fluoropolyether base rubber composition which is prevented from changing its curing behavior with time and suppressed in outgassing and cures into rubber having improved properties.

The invention pertains to a curable fluoropolyether base rubber composition comprising (A) a linear fluoropolyether compound having at least two alkenyl groups in a molecule and a perfluoroalkyl ether structure in its backbone, (B) a silica filler having a specific surface area of at least 50 m$^2$/g, (D) an organosilicon compound having at least two hydrogen atoms each attached to a silicon atom in a molecule, and (E) a hydrosilylation catalyst. We have found that the blending of (C) diatomaceous earth in the composition is effective for suppressing the composition's outgassing and preventing the composition from changing its curing behavior with time under the influence of impurities.

Therefore, the invention provides a curable fluoropolyether base rubber composition comprising the above components (A) to (E).

BRIEF DESCRIPTION OF THE DRAWING

The only FIGURE.

DESCRIPTION OF THE PREFERRED EMBODIMENT (A) Linear Fluoropolyether Compound

The linear fluoropolyether compound (A) should have at least two alkenyl groups in a molecule and a divalent perfluoroalkyl ether structure in its backbone. It is a base polymer of the composition.

Examples of the alkenyl groups in the linear fluoropolyether compound include groups having a $CH_2=CH-$ structure at an end such as vinyl, allyl, propenyl, isopropenyl, butenyl and hexenyl groups, with the vinyl and allyl being preferred. The alkenyl groups may be attached to the backbone of the linear fluoropolyether compound at opposite ends either directly or through divalent linkages such as $-CH_2-$, $-CH_2O-$ or $-Y-NR-CO-$. Herein Y is $-CH_2-$ or (inclusive of o-, m- and p-positions) and R is hydrogen, methyl, phenyl or allyl.

The perfluoroalkyl ether structure in the linear fluoropolyether compound is exemplified by the following general formula:

wherein Rf is a straight or branched perfluoroalkylene group of 1 to 6 carbon atoms, preferably 1 to 3 carbon atoms, and q is an integer of 1 to 500, preferably 2 to 400, and more preferably 10 to 200. Examples of the recurring units represented by $-(Rf-O)-$ include $-CF_2O-$, $-CF_2CF_2O-$, $-CF_2CF_2CF_2O-$, $-CH(CF_3)CF_2O-$, $-CF_2CF_2CF_2CF_2O-$, $-CF_2CF_2CF_2CF_2CF_2CF_2O-$, and $-C(CF_3)_2O-$. Preferred units are $-CF_2O-$, $-CF_2CF_2O-$, $-CF_2CF_2CF_2O-$, and $-CH(CF_3)CF_2O-$.

The perfluoroalkyl ether structure is constructed of recurring units $-(Rf-O)-$ of one type or in combination of two or more types.

Typical of the linear fluoropolyether compound (A) are linear fluoropolyether compounds of the following general formula (1) having a molecular weight of 400 to 100,000, preferably 1,000 to 50,000.

(1)

Herein X is independently —CH$_2$—, —CH$_2$O— or —Y—NR—CO—. Y is

(inclusive of o-, m- and p-positions) and R is hydrogen, methyl, phenyl or allyl. The letter p is independently 0 or 1, L is an integer of 2 to 6, m and n each are an integer of 0 to 200, preferably 5 to 100.

Illustrative, non-limiting, examples of the linear fluoropolyether compounds of formula (1) are given below.

Herein m and n are as defined in formula (1).

The linear fluoropolyether compounds may be used alone or in combination of two or more.

(B) Silica Filler

The silica filler is silica particles having a specific surface area of at least 50 m$^2$/g (as measured by the BET nitrogen adsorption method) and used for the reinforcement of the curable fluoropolyether base rubber composition. The silica filler may be either dry silica also known as fumed silica or wet silica also known as precipitated silica. The silica may have been treated with organochlorosilanes, silazane compounds or cyclic silazane compounds which react with hydroxyl groups attached to silicon atoms on the surface. Alternatively, the silica may have been hydrophobicized on the surface by treating with dimethylpolysiloxane having a low degree of polymerization.

The amount of the silica filler blended is 10 to 40 parts, preferably 15 to 30 parts by weight per 100 parts by weight of component (A). Less than 10 parts by weight of silica fail to achieve reinforcement whereas more than 40 parts by weight of silica is difficult to blend because of an increased viscosity.

(C) Diatomaceous Earth

Diatomaceous earth (C) is effective for suppressing outgassing and preventing the composition from changing a heat curing behavior with time.

Natural diatomaceous earth made up of diatom tests as a raw material varies in size from several microns to several millimeters although it is most often available as powder with a size of about 20 μm. The shape is diverse among disc, sphere, cylinder, spindle and rod shapes. A geometrical pattern is observed on the surface of diatom tests, which pattern consists of microscopic pores communicating the interior and the exterior of cells and having a size of 0.1 to 1 μm, giving a highly porous structure. Owing to this structure, diatomaceous earth adsorbs volatile components in the composition and amines and other impurities originating from the silica surface treating agent or the like, thereby suppressing outgassing and preventing any change of a heat curing behavior with time by impurities in the composition.

Diatomaceous earth used herein is obtained by grinding the raw material, drying, repeating classification for removing impurities and narrowing the particle size distribution, firing in a rotary kiln at a high temperature of 800 to 1200° C. for improving adsorbent properties, grinding the resulting clinker, repeating classification for narrowing the particle size distribution, thereby collecting a fraction with a sufficiently small size of 1 to 50 μm to use as a filler.

The amount of diatomaceous earth blended is 5 to 35 parts by weight, and preferably 10 to 30 parts by weight per 100 parts by weight of component (A). Less than 5 parts by weight of diatomaceous earth is too small to achieve the desired effects whereas more than 35 parts by weight adversely affects physical properties such as tensile strength and elongation.

(D) Organosilicon Compound

The organosilicon compound (D) serves as a crosslinking agent and chain extender for component (A). The organosilicon compound is not critical as long as it has at least two hydrogen atoms each attached to a silicon atom, that is, at least two hydrosilyl (SiH) groups in a molecule. When compatibility with and dispersion in component (A) and uniformity after curing are taken into account, the organosilicon compound should preferably have in one molecule at least one monovalent perfluorooxyalkyl group, monovalent perfluoroalkyl group, divalent perfluorooxyalkylene group or divalent perfluoroalkylene group and at least two, especially at least three hydrosilyl groups.

The perfluoroalkyl, perfluorooxyalkyl, perfluoroalkylene and perfluorooxyalkylene groups are exemplified by the groups of the following general formulae.

Monovalent Perfluoroalkyl Groups:

Letter m is an integer of 1 to 20, preferably 2 to 10.

Divalent Perfluoroalkylene Groups:

Letter m is an integer of 1 to 20, preferably 2 to 10.

Monovalent Perfluorooxyalkyl Groups:

Letter n is an integer of 1 to 5.

Divalent Perfluorooxyalkylene Groups:

Letters m and n each are an integer of 1 to 50, and m+n is an integer of 2 to 100.

Letters m and n each are an integer of 1 to 50.

These perfluoro(oxy)alkyl and perfluoro(oxy)alkylene groups each may be attached either directly to a silicon atom or to a silicon atom through a divalent linking group. The divalent linking group is an alkylene group, arylene group or a mixture thereof, which may further have an ether bond oxygen atom, amide bond or carbonyl bond. Such divalent linking groups of 2 to 12 carbon atoms are preferred. Illustrative examples thereof include wherein Ph is phenyl.

In addition to the monovalent organic group containing a monovalent or divalent fluorinated substituent, that is, a perfluoroalkyl, perfluorooxyalkyl, perfluoroalkylene or perfluorooxyalkylene group, the organosilicon compound (D) may have a monovalent substituent attached to a silicon atom. Exemplary monovalent substituents are substituted or unsubstituted hydrocarbon groups of 1 to 20 carbon atoms including alkyl groups such as methyl, ethyl, propyl, butyl, hexyl, cyclohexyl, octyl and decyl; alkenyl groups such as vinyl and allyl; aryl groups such as phenyl, tolyl, and naphthyl; aralkyl groups such as benzyl and phenylethyl; and substituted ones of these groups in which some of the hydrogen atoms are replaced by chlorine atoms, cyano groups or the like, such as chloromethyl, chloropropyl, and cyanoethyl.

The organosilicon compound (D) may be cyclic, chainlike or three-dimensional network or a combination thereof. The number of silicon atoms in the molecule of the organosilicon compound is not critical although it desirably has about 2 to about 60 silicon atoms, and especially about 3 to about 30 silicon atoms.

Illustrative examples of the organosilicon compound are given below. They may be used alone or in admixture of two or more. In the formulae, Me is methyl and Ph is phenyl.

Herein, m is an integer of 1 to 20 and on the average 10, and n is an integer of 1 to 10 and on the average 6.

Herein, S is n is an integer of 1 to 30, m is an integer of 1 to 30, and n+m is 2 to 60, and on the average 2 to 50.

Herein, S is n is an integer of 1 to 30, m is an integer of 1 to 30, and n+m is 2 to 60, and on the average 2 to 50.

Herein, n is an integer of 1 to 60 and on the average 3 to 50.

Herein, n is an integer of 1 to 60 and on the average 3 to 50.

Herein, n is an integer of 1 to 60 and on the average 3 to 50.

Component (D) is blended in an effective amount to cure component (A). Usually, component (D) having hydrosilyl groups is blended in such an amount that 0.5 to 5 mol, and more preferably 1 to 2 mol of the hydrosilyl (or SiH) groups may be present per mol of the alkenyl groups (e.g., vinyl, allyl or cycloalkenyl) in the entire composition, especially component (A). Less amounts of component (D) may achieve an insufficient degree of crosslinking. Excessive amounts of component (D) may allow chain lengthening to become preferential, inviting short curing, foaming, and losses of heat resistance and compression set. An appropriate amount of component (D) blended is 0.1 to 50 parts by weight per 100 parts by weight of component (A).

(E) Hydrosilylation Catalyst

Component (E) is a hydrosilylation catalyst which is preferably selected from transition metals, for example, platinum group metals such as Pt, Rh and Pd, and compounds of transition metals. Most of these compounds are noble metal compounds which are expensive. Platinum compounds are thus used because they are readily available. Exemplary platinum compounds include chloroplatinic acid, complexes of chloroplatinic acid with olefins such as ethylene, complexes of chloroplatinic acid with alcohols and vinylsiloxanes, and platinum supported on silica, alumina or carbon though not limited thereto. Known platinum group metal compounds other than the platinum compounds include rhodium, ruthenium, iridium, and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph denotes phenyl.

The amount of the catalyst used is not critical. A catalytic amount can achieve a desired curing rate. However, since the catalyst may be supported on a carrier such as silica or alumina or diluted with a solvent, the catalytic amount varies with the form and dilution ratio of the catalyst. From the economical aspect and to obtain satisfactory cured products, the platinum group metal compound is preferably added in an amount of 0.1 to 1,000 parts, more preferably 0.1 to 500 parts by weight calculated as the platinum group metal per million parts by weight of the entire curable composition.

Other Components

Insofar as the benefits of the invention are not impaired, various well-known additives may be added to the inventive composition in addition to the above essential components (A) to (E). Such optional additives include inhibitors of the hydrosilylation catalyst, for example, acetylene alcohols such as 1-ethyl-1-hydroxycyclohexane, 3-methyl-1-butyn-3-ol, 3,5-dimethyl-1-hexyn-3-ol, 3-methyl-1-penten-3-ol, and phenylbutynol, as well as 3-methyl-3-penten-1-yn and 3,5-dimethyl-3-hexen-1-yn; tackifiers, for example, organosiloxanes having alkoxy, epoxy or SiH groups in the molecule such as the compound shown below; pigments such as iron oxide, cerium oxide and carbon black; colorants, dyes, and antioxidants.

Depending on its application, the rubber composition of the invention is formulated as a single composition having all the essential components (A) to (E) incorporated therein, that is, of one pack type. Alternatively, the rubber composition is formulated to two pack type, for example, one pack containing a portion of (A), a portion of (B), a portion of (C), and (D) and the other pack containing the remainder of (A), the remainder of (B), the remainder of (C), and (E) whereupon the two packs are mixed on use.

The composition of the invention will readily cure when it is allowed to stand at room temperature or by heating. Often, the composition is preferably cured by heating at a temperature from room temperature (e.g., 10–30° C.) to about 180° C. for about 5 minutes to about 24 hours.

The curable fluoropolyether base rubber compositions cure into products having a good profile of properties. Thus the compositions are useful in a wider variety of applications and suitable for use as diaphragms and seal parts (e.g., O-rings, packing and gaskets) where chemical resistance, oil resistance and the like are required as in chemical plants, business machines (e.g., copiers and printers), automobiles, aircraft, semiconductor devices, medical equipment, and analytical instruments.

EXAMPLE

Examples of the invention are given below by way of illustration and not by way of limitation. All parts are by weight, and the viscosity is a measurement at 25° C.

Example 1

To 100 parts of a polymer of formula (2) shown below (viscosity 4.4 Pa-s, average molecular weight 16500, and vinyl content 0.012 mol/100 g) was added 20 parts of hexamethylcyclotrisilazane-treated silica (Aerosil 300 by Nippon Aerosil K.K.). After they were mixed and heat treated at 150° C. for 2 hours, 20 parts of diatomaceous earth (Radiolite F by Showa Chemical K.K.) was added to the mixture, which was milled on a three-roll mill, obtaining a base compound.

In this example, the composition was formulated to the two-pack type consisting of packs A and B. Pack A was prepared by adding 0.4 part of a toluene solution of a catalyst in the form of chloroplatinic acid modified with a compound of formula (3) shown below (platinum concentration 0.5% by weight) to 140 parts of the base compound, then uniformly mixing them in vacuum. Pack B was prepared by adding 0.8 part of a 50% toluene solution of ethylcyclohexanol and 6.71 parts of an organosilicon compound containing SiH groups of formula (4) shown below to 132.9 parts of the base compound, then uniformly mixing them in vacuum.

Table 1 shows the volatile contents of Packs A and B as measured by heating at 105° C. for 3 hours.

Figure 1:
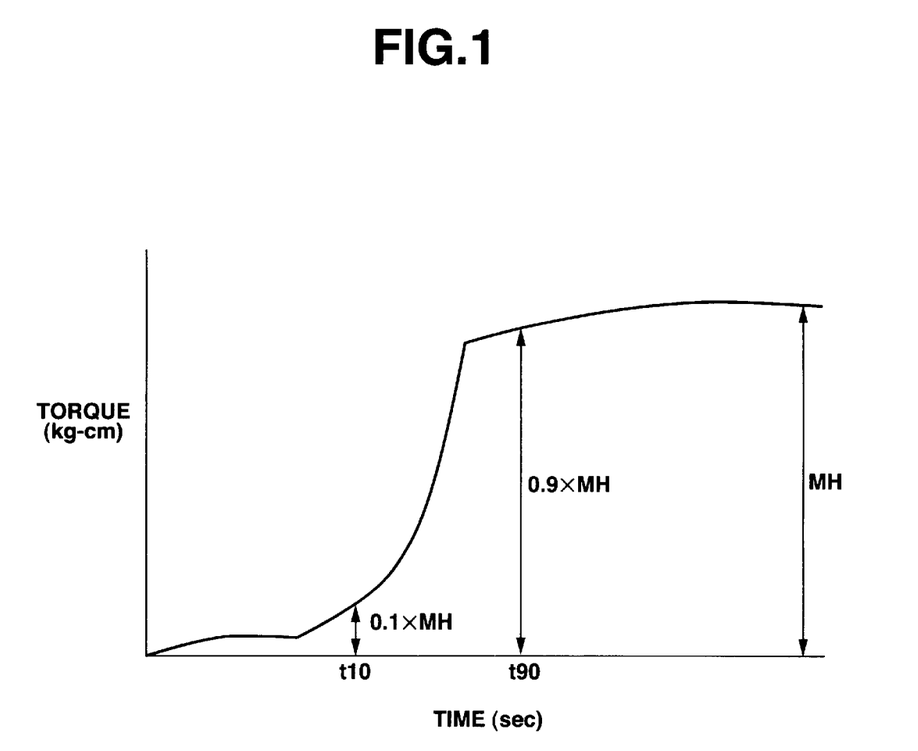
FIG. 1 is a graph showing the measurement of a curing behavior by means of a rheometer.

Table 2 shows the curing behavior of the two-pack type composition at the initial and after 2 months of storage. The curing behavior was examined by blending Packs A and B in a weight ratio of 1:1, uniformly mixing them in vacuum, and measuring a 10% vulcanization time (t10), a 90% vulcanization time (t90), and a maximum torque (MH) at 180 seconds by means of an oscillating rheometer (ASTM-100 type by Toyo Seiki Mfg. K.K.). The measuring conditions were 12° C. and 3 minutes. As seen from FIG. 1, t10 and t90 are times taken until the torque reaches 10% and 90% of MH.

Comparative Example 1

To 100 parts of a polymer of formula (2) (viscosity 4.4 Pa-s, average molecular weight 16500, and vinyl content 0.012 mol/100 g) was added 20 parts of hexamethylcyclotrisilazane-treated silica (Aerosil 300 by Nippon Aerosil K.K.). They were mixed and heat treated at 150° C. for 2 hours, then milled on a three-roll mill, obtaining a base compound.

Pack A was prepared by adding 0.4 part of a toluene solution of a catalyst in the form of chloroplatinic acid Me is methyl and $Rf^1$ is modified with a compound of formula (3) (platinum concentration 0.5% by weight) to 120 parts of the base compound, then uniformly mixing them in vacuum. Pack B was prepared by adding 0.8 part of a 50% toluene solution of ethylcyclohexanol and 6.71 parts of an organosilicon compound containing SiH groups of formula (4) to 112.9 parts of the base compound, then uniformly mixing them in vacuum.

Table 1 shows the volatile contents of Packs A and B as measured by heating at 105° C. for 3 hours.

The curing behavior of the two-pack type composition at the initial and after 2 months of storage was examined as in Example 1, with the results shown in Table 2.

TABLE 1

| | Volatile content (%) | |
| --- | --- | --- |
| | Pack A | Pack B |
| Example 1 | 0.1 | 0.1 |
| Comparative Example 1 | 0.3 | 4.7 |

It is evident from Table 1 that the composition of Example 1 has an extremely lower volatile content than the composition of Comparative Example 1.

TABLE 2

| | | Curing behavior | | |
| --- | --- | --- | --- | --- |
| | | t10 (sec) | t90 (sec) | MH (kg-cm) |
| Example 1 | initial | 53 | 66 | 35 |
| | after 2 months | 50 | 67 | 34 |
| Comparative Example 1 | initial | 51 | 60 | 22 |
| | after 2 months | 60 | 96 | 17 |

It is evident from Table 2 that the composition of Example 1 experiences an extremely smaller change with time of curing behavior than the composition of Comparative Example 1.

There has been described a curable fluoropolyether base rubber composition having blended therein diatomaceous earth which is effective for suppressing outgassing and preventing the composition from changing its thermosetting behavior with time under the influence of impurities. The resulting fluoropolyether base rubber has a good profile of water repellency, oil repellency, solvent resistance, chemical resistance and weather resistance inherent thereto.

Japanese Patent Application No. 2000-001205 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether base rubber composition comprising (A) 100 parts by weight of a linear fluoropolyether compound having at least two alkenyl groups in a molecule and a perfluoroalkyl ether structure in its backbone,

(B) 10 to 40 parts by weight of a silica filler having a specific surface area of at least 50 $m^2/g$, (C) 5 to 35 parts by weight of diatomaceous earth, (D) an organosilicon compound having at least two hydrogen atoms each attached to a silicon atom in a molecule, and (E) a hydrosilylation catalyst, components (D) and (E) being in effective amounts to cure component (A).

2. The composition of claim 1 wherein the linear fluoropolyether compound (A) has the following general formula (1):

(1)

wherein X is independently —$CH_2$—, —$CH_2O$— or —Y—NR—CO—, wherein Y is —$CH_2$— or and R is hydrogen, methyl, phenyl or allyl, p is independently 0 or 1, L is an integer of 2 to 6, m and n each are an integer of 0 to 200.

3. A composition of claim 1, wherein at least one alkenyl group in the linear fluoropolyether compound is a $CH_2$=CH- and a terminal end.

4. A composition of claim 1, wherein the alkenyl groups in the linear fluoropolyether compound are each independently a vinyl, allyl, propenyl, isopropenyl, butenyl or hexenyl group.

5. A composition of claim 1, wherein the alkenyl groups in the linear fluoropolyether compound are each independently a vinyl or allyl group.

6. A composition of claim 1, wherein the linear fluoropolyether compound has a molecular weight of 400 to 100,000.

7. A composition of claim 2, wherein m and n each are an integer of 5 to 100.

8. A compound of claim 2, wherein the compound of formula (1) is wherein m and n are as defined in claim (1).

9. A composition of claim 1, wherein the silica filler is fumed silica or precipitated silica, each optionally treated with an organochlorosilane, a silazane compound or a cyclic or silazane compound which reacts with hydroxyl groups attached to silicon atoms or treated with a dimethylpolysiloxane having a low degree of polymerization.

10. A composition of claim 1, comprising 15 to 30 parts by weight of silica filler.

11. A composition of claim 1, wherein the diatomaceous earth has particle sizes of 1 to 50 μm.

12. A composition of claim 1, comprising 10 to 30 parts by weight of diatomaceous earth.

13. A composition of claim 1, wherein the organosilicon compound comprises at least one monovalent perfluorooxyalkyl group, monovalent perfluoroalkyl group, divalent perfluorooxyalkylene group or divalent perfluoroalkylene group and at least two hydrosilyl groups.

14. A composition of claim 1, wherein the organosilicon compound is

-continued wherein m is an integer of 1 to 20, n is an integer of 1 to 10, and Me is methyl, wherein S is n is an integer of 1 to 30, m is an integer of 1 to 30, n+m is 2 to 60, Me is methyl and Ph is phenyl, wherein S is n is an integer of 1 to 30, m is an integer of 1 to 30, n+m is 2 to 60, Me is methyl and Ph is phenyl, wherein n is an integer of 1 to 60 and Me is methyl, wherein n is an integer of 1 to 60, Me is methyl and Ph is phenyl, wherein n is an integer of 1 to 60 and Me is methyl, or a mixture thereof.

15. A composition of claim 1, wherein the hydrosilylation catalyst is a transition metal or a compound comprising a transition metal.

16. A composition of claim 15, wherein the transition metal is Pt, Rh or Pd, and the compound comprising a transition metal is chloroplatinic acid, a complex of chloroplatinic acid with an olefin, a complex of chloroplatinic acid with an alcohol or a vinylsiloxane.

17. A composition of claim 1, wherein the hydrosilylation catalyst is $RhCl(PPh_3)_3$, $RhCl(CO)(PPh_3)_2$, $RhCl(C_2H_4)_2$, $Ru_3(CO)_{12}$, $IrCl(CO)(PPh_3)_2$, or $Pd(PPh_3)_4$ wherein Ph is phenyl.

18. A composition of claim 1, wherein the hydrosilylation catalyst is supported on a carrier or diluted with a solvent.

19. A composition of claim 1 further comprising an inhibitor of the hydrosilylation catalyst, a tackifier, a pigment, a colorant, a dye, an antioxidant or a mixture thereof.

20. A composition of claim 1, wherein the linear fluoropolyether compound has a molecular weight of 1,000 to 50,000.

* * * * *